UNITED STATES PATENT OFFICE.

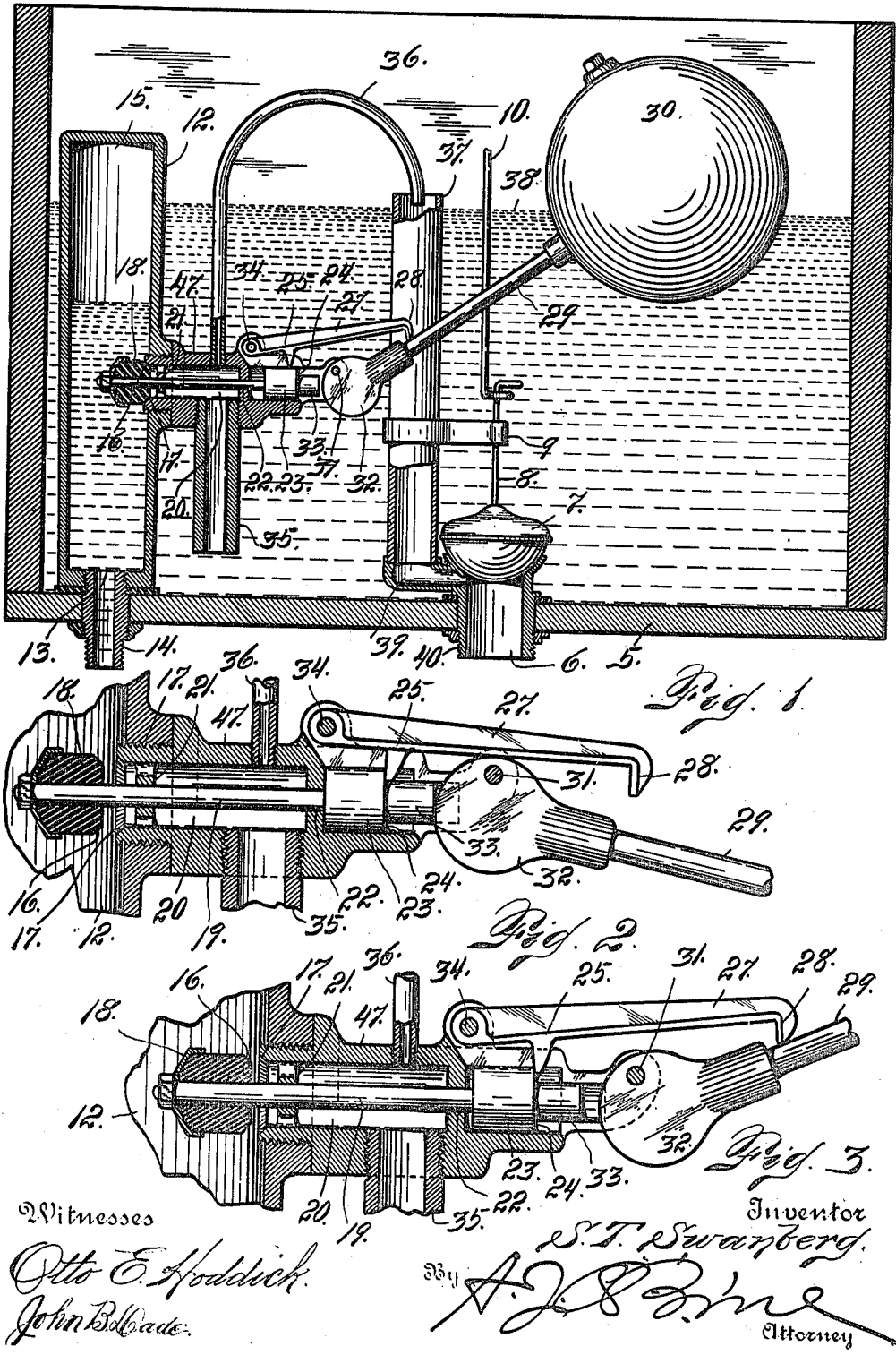

SWAN T. SWANBERG, OF DENVER, COLORADO.

NOISELESS FLOAT-VALVE.

1,158,743.  Specification of Letters Patent.  Patented Nov. 2, 1915.

Application filed October 19, 1914. Serial No. 867,314.

*To all whom it may concern:*

Be it known that I, SWAN T. SWANBERG, a citizen of the United States, residing in the city and county of Denver and State of Colorado, have invented certain new and useful Improvements in Noiseless Float-Valves; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in float controlled valves for water closet tanks.

The object of my improved construction is to render the closing of the inlet valve of a tank of this character noiseless and to this end, I provide an air cushion which is formed in the upper part of the chamber at whose lower extremity water enters before passing into the tank. In the wall of this chamber is formed an opening surrounded by a seat which the valve engages when in the closed position. This valve, when the float is sufficiently raised for the purpose, is moved automatically, and by virtue of the pressure of the water, into engagement with the seat. However, as there is an air cushion in the upper part of this chamber, the sudden rush or pressure of the water expends itself upon this cushion with the result that the valve closes quickly, but noiselessly, rather than with a great noise and jar, as would be the case in the absence of the air cushion. The stem of this valve is acted on by a cam formed on the inner extremity of the float arm, whereby, as the float moves downwardly in the tank as the water recedes or lowers in the tank, this cam or eccentric, acts upon the stem to open the valve, and as soon as the valve is in the wide open position, a pawl or dog engages a shoulder upon the stem and locks the valve in the open position until the tank is refilled sufficiently to change the position of the stem and unlock the valve, the stem being connected with the dog in such a manner as to release the latter as soon as the tank is filled to the desired extent.

Having briefly outlined my improved construction, I will proceed to describe the same in detail, reference being made to the accompanying drawing, in which is illustrated an embodiment thereof.

In this drawing,—Figure 1 is a section taken through a tank equipped with my improved noiseless valve mechanism construction. Fig. 2 is a detail view illustrating the valve mechanism on a larger scale. Fig. 3 is a similar view showing the parts in different relative positions.

The same reference characters indicate the same parts in all the views.

Let the numeral 5 designate a flush tank having a discharge opening 6 normally closed by a valve 7, having a stem 8 passing through a guide 9, the upper extremity of the stem being connected with a rod 10 which may be actuated by a pull cord, chain or other suitable means when it is desired to open the valve for the purpose of flushing the closet.

Arranged at one side of the tank is a chamber 12 which is closed at its upper extremity, its lower extremity being open as shown at 13 and registering with a nipple 14 which is inserted through an opening in the bottom of the tank and threaded into the opening 13 in the bottom of the chamber 12. As the water rises in this chamber, as illustrated in Fig. 1, the air is compressed in the upper portion 15 of the tank, forming a cushion. In one side of the chamber 12 is formed an opening 16 into which is threaded a fixture 47, having one extremity projecting slightly into the chamber 12 and upon which is formed a seat 17 for a valve 18, which is connected with a horizontally disposed stem 19, which passes through an auxiliary chamber 20 formed in the fixture 47, the said fixture having a guide 21 at one extremity and passing through an opening 22 in the opposite extremity of the auxiliary chamber.

Beyond the auxiliary chamber, the piston stem is provided with an enlargement 23 upon which is formed a shoulder 24 adapted to be engaged by a pawl or dog 25 when the valve is in the open position (see Figs. 2 and 3). This pawl is provided with an extension 27 having a hooked shaped extremity 28 adapted to be acted on by the stem 29 of the float 30, as the float rises in response to the rise of the water in the tank. The inner extremity of the stem 29 is eccentrically pivoted as shown at 31, the stem being enlarged, whereby a disk 32 is formed, the lower portion of the disk forming a cam which acts upon the inner extremity 33 of the valve stem 19, and serves to open the valve when the stem of the float is lowered sufficiently for the purpose.

The pawl 25 is pivotally mounted as shown at 34, and when the float is in the raised position, the pawl or dog is held out of engagement with the valve stem. When, however, the float falls so that the stem assumes the position shown in Fig. 2, the eccentric cam or cam disk 32 acts upon the inner extremity 33 of the valve stem 19, whereby an endwise movement is imparted to the stem, and the valve is moved to the open position (see Figs. 2 and 3). As soon as this occurs the dog or pawl 25 will drop into engagement with the shoulder 23 of the valve stem and lock the valve in the open position. As soon as the valve is opened, the water enters the chamber 12 through the nipple 14 and as the air is trapped in the upper part of the chamber, an air cushion 15 is formed. The water passes from the chamber 12 into and through the auxiliary chamber 20, and thence downwardly through a pipe 35 into the tank, the said pipe terminating in an open extremity near the bottom of the tank.

In order to allow a small amount of water to constantly enter the closet when the valve 7 is closed, a tube 36 is connected with the fixture 47 and extends upwardly in the tank, and discharges its contents into the upper extremity of a conduit 37 which projects above the water level 38. The lower extremity of this conduit communicates with a passage 39 which leads to the discharge opening 6 at a point below the valve, as shown at 40.

From the foregoing description, the use and operation of my improved noiseless float controlled valve will be readily understood. Assuming that the tank contains the normal water supply and that the parts are in the position shown in Fig. 1, if the valve 7 is opened, the water will pass rapidly out of the tank through the opening 6 into the closet for flushing purposes. As the water lowers in the tank, the float will fall to correspond therewith, and as soon as it is sufficiently lowered, or as soon as the water falls to the desired limit within the tank, the eccentric cam 32 will act upon the stem 19 of the valve 18 to open the latter, and as soon as this occurs, the dog 25 will automatically drop into engagement with the shoulder 23 of the valve stem, and lock the valve in the open position. Now, as the water enters the tank through the chamber 12, it rises in the tank and lifts the float. As the float rises, its stem 29 acts upon the extension 27 of the dog to disengage the latter from the shoulder 23 of the valve stem as soon as the tank has received the desired quantity of water. As soon as this occurs, the valve 18 will move quickly against its seat 17 in response to the pressure of the water in the chamber 12, the water pressure expending its force to a large extent upon the air cushion 15 in the top of the chamber, as heretofore explained.

Having thus described my invention, what I claim is,—

1. Noiseless inlet valve mechanism for water closet tanks, comprising in combination with the tank, a chamber closed at its upper extremity and open at its lower extremity for the entrance of the water on its way to the tank, the chamber having an opening for the escape of the water into the tank, and a valve for controlling said opening, means adapted to engage the stem of the said valve for locking the latter in the open position, and means for disengaging the first named means from the stem of the valve, the valve being located in said chamber and acted on by the water pressure therein for closing purposes.

2. Noiseless inlet valve mechanism for water closet tanks comprising in combination with the tank, a chamber closed at its upper extremity and open at its lower extremity for the entrance of the water on its way to the tank, the chamber having an opening for the escape of the water into the tank, a valve for controlling said opening, the valve being located in said chamber and acted on by the water pressure therein for closing purposes, a float located in the tank and provided with a stem having a cam at its inner extremity, the valve having a stem adapted to be acted on by the cam for opening the valve when the float has reached its low position in the tank, the valve stem having a shoulder, and a dog pivotally mounted adjacent the stem and adapted to engage said shoulder and lock the valve in the open position, the dog having an extension engaging the stem of the float whereby it is acted upon by the said stem as the float rises to disengage the dog from the valve stem and allow the valve to close.

3. A noiseless inlet valve mechanism for water closet flush tanks, comprising in combination with the tank, a chamber closed at its upper extremity and open at its lower extremity for the introduction of water on its way to the tank, the chamber having an opening for the escape of the water into the tank, a valve for controlling said opening, a float mounted to open said valve as the float reaches a relatively low position in the tank, means adapted to engage the stem of the valve for positively locking the valve in the open position, the said means being arranged to be acted upon by the stem of the float to release the locking means and allow the valve to close when the float has reached a relatively high position in the tank.

In testimony whereof I affix my signature in presence of two witnesses.

SWAN T. SWANBERG.

Witnesses:
A. J. O'BRIEN,
A. EBERT O'BRIEN.